Jan. 15, 1963     O. K. KELLEY     3,073,183
TRANSMISSION Original Filed Oct. 27, 1952     8 Sheets-Sheet 2

INVENTOR.
OLIVER K. KELLEY
BY
Barnes, Kisselle, Laughlin & Raisch
ATTORNEYS.

O. K. KELLEY 3,073,183

TRANSMISSION

Original Filed Oct. 27, 1952

INVENTOR.
OLIVER K. KELLEY
BY
Barnes, Kisselle, Laughlin & Rausch
ATTORNEYS.

Jan. 15, 1963　　　　O. K. KELLEY　　　　3,073,183
TRANSMISSION

Original Filed Oct. 27, 1952　　　　　　　　　8 Sheets-Sheet 7

INVENTOR.
OLIVER K. KELLEY
BY
Barnes, Kisselle, Laughlin & Raisch
ATTORNEYS.

United States Patent Office 3,073,183
Patented Jan. 15, 1963

3,073,183
TRANSMISSION
Oliver K. Kelley, Bloomfield Hills, Mich., assignor to General Motors Corporation, Detroit, Mich., a corporation of Delaware
Continuation of application Ser. No. 317,095, Oct. 27, 1952. This application Apr. 18, 1958, Ser. No. 731,569
16 Claims. (Cl. 74—732)

This invention relates to automatic transmissions for automotive vehicles. The specification which follows is a continuation of my application, Serial No. 317,095 filed October 27, 1952.

The transmission which is disclosed herein, as one example of the invention, is suitable for transmitting power for driving vehicles of the track laying type, for military or other purposes. In this respect the transmission disclosed herein is of a cross drive construction in that the torque output shaft extends crosswise of the vehicle for driving sprocket elements over which the endless tracks of the vehicle operate, but certain features of the invention are useful in any type of vehicle.

The objects of the invention include an arrangement for cooling brakes of the vehicle, which brakes are also employed in the steering of a track laying vehicle, wherein a cooling and lubricating oil is pumped over the brakes when and only when they are in use. Thus, in normal operation, the oil is not maintained under pressure with resultant economy of operation and the saving of wear on the pumps and related parts.

The objects include a control system for a vehicle, and particularly one of the track laying type wherein, through the means of common control elements, an operator may manipulate brakes for the vehicle, and control power output clutches of the vehicle. In this way the vehicle may be controlled and steered easily. The objects also include an arrangement of cone clutches in the transmission for engaging and releasing friction elements to change from one speed ratio to another, which cone elements are arranged so that one provides reaction for the other and so cushions the shift. This construction is applicable to a transmission for any purpose. Some of the gearing of the transmission requires efficient lubrication and cooling and the invention provides a construction for delivering cooling and lubricant oil to certain of the main driving gears.

The transmission embodies a combination including a fluid torque converter with speed change gearing and a lock-up clutch for the torque converter, which clutch, if is is engaged for transmitting torque, becomes disengaged during a change of speed ratio, after which the clutch re-engages. Thus, in making a speed ratio change, the torque is transmitted through the fluid torque converter which softens the shift.

Other objects include a hydraulic control system in which hydraulic medium is pumped under pressure through the torque converter. The discharge line from the torque converter is controlled by the pressure of the inlet line for the torque converter and thus excessive pressure in the torque converter (indicated by the pressure in the inlet line of the torque converter) cannot be built up. Moreover, the hydraulic system includes a governor which reduces main line, or pump, pressure at normal vehicle speeds, which may be termed relatively high speed. Thus, in normal operation a relatively low pressure is maintained on the high side of the pump with resultant saving in power as well as wear on the parts.

These and other objects will be fully appreciated as the following detailed description is considered in conjunction with the accompanying drawings. The drawings show one form of transmission which embodies the invention.

Figure 1:
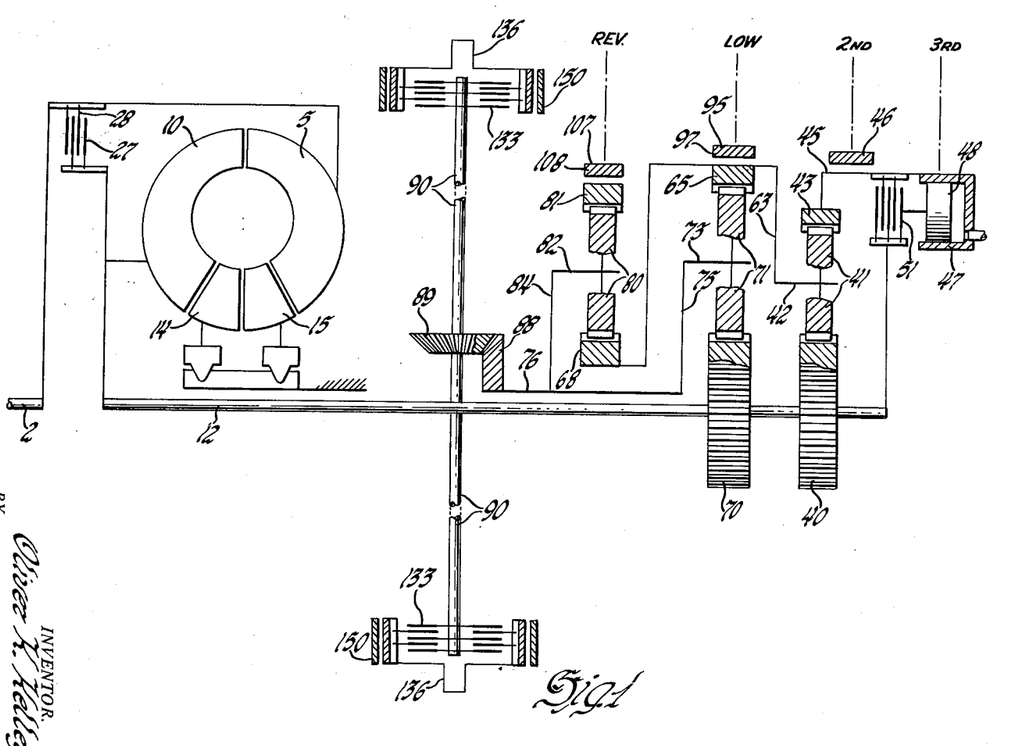
FIG. 1 is a schematic representation of a transmission and final drive embodying one form of the invention, the transmission being shown as one-half of a longitudinal section which is symmetrical about its axis.

As shown in FIG. 1 the transmission has a torque converter including an impeller 5 driven by an engine 2, a turbine 10 and reaction elements 14 and 15. The turbine 10 rotates a converter output shaft 12 which can be connected to the impeller 5 by a lock-up clutch 27—28 when it is desired to drive the shaft 12 directly from the engine. The converter output shaft is the input shaft for a planetary change-speed transmission including two input sun gears 40 and 70 driven by the shaft 12. The sun gear 70 meshes with planets 71 mounted on a carrier 73—75 and meshing with a reaction ring gear 65 which may be held by a brake 95—97 to drive the carrier forward at low speed. The carrier is connected to output shaft 76. The sun gear 40 meshes with planets 41 mounted on a carrier 42—63 and meshing with a reaction ring gear 43 which can be held by a brake 46 to drive the carrier 42—63 forward when the brake 95—97 is released. This drives the ring gear 65 forward and thereby drives the carrier 73—75 forward faster than when the ring gear 65 is held, because sun gear 70 is also rotating. This effects second speed. Third speed, or direct drive through the gearing, is established by locking up the planetary gearset 40—42—43 by a clutch 51 which can connect ring gear 43 to sun gear 40 when it is set by a piston 48 in a hydraulic cylinder 47.

Reverse is established by a third planetary gearset including an input sun gear 68 driven by the ring gear 65 and meshing with planets 80 mounted on a carrier 82—84 connected to the output shaft, and also meshing with a reverse reaction ring gear 81 which can be held by reverse brake 107—108. When all other friction torque-establishing devices are released and the reverse brake 107—108 is set, forward torque on sun gear 70 drives ring gear 65 backward because the carrier 73—74—75 is initially held by the resistance of the output shaft 76, which is geared to the vehicle, as will be explained. Reverse rotation of ring gear 65 rotates sun gear 68 backward, which, when ring gear 81 is held, rotates carrier 82—84 backward to drive output shaft 76 backward.

A bevel drive gear 88 is keyed to output shaft 76 and meshes with bevel gear 89 keyed to cross shaft 90 which at each end has a final drive clutch 133 which can be engaged to rotate a final drive shaft 136. The clutches can be operated independently and the final drive shafts 136 can be separately or simultaneously retarded by brakes 150. The shafts 136 may drive tracks, and the vehicle can be steered by various combinations of clutching and braking, as will be explained.

The transmission may be contained in a suitable housing 1 secured to an engine, the shaft of which is shown at 2 with fly wheel 3. The impeller 5 of a fluid torque converter is secured to the flywheel at 6. The part of the impeller remote from the flywheel is journalled on a bearing 7 and it has secured thereto a gear 8 for driving pumps for the control system, as will be explained. The driven member or turbine of the torque converter 10 is mounted upon a flange 11 secured to the converter output shaft which is the gearing input shaft 12 which has a passageway 13 therein.

The torque converter is completed by two reaction elements or stators 14 and 15 each supported on a fixed ground member 16 by one-way brakes, the ground member 16 being secured to a fixed sleeve 20. The elements of the torque converter thus form a torus chamber and in the torus chamber are impeller blades or vanes 21, turbine blades 22, and reaction blades 23 and 24. Hydraulic medium such as oil is supplied to the torus chamber.

Figure 4:
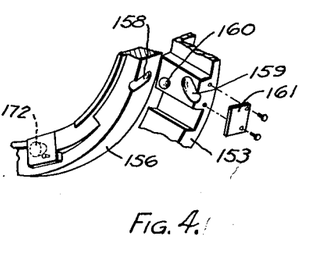
FIG. 4 is an exploded perspective illustrating brake actuating structure.

The lock up clutch has a clutch disc 27 secured to the turbine flange 11 and positioned between a driving member 28 and a piston 29 which serves as a pressure plate. The piston is disposed within a cylinder 30 formed in a front cover 31 which completes the container constituting the torque converter and is secured to the impeller. The piston is rotated with the cover 31 but can shift axially in the cylinder. Driving pins for the piston are indicated at 32. A bearing 33 is positioned between the stator support 16 and the hub part of turbine flange 11; the converter output shaft 12 has a counter-bored end portion for receiving a central extension 34 of the piston 29, the hollow part forming a passageway 35 which communicates with the bore 13 so that oil can pass into the cylinder 30 to actuate the piston 29, urging it to the right as FIG. 4 is viewed, to engage the clutch.

Figure 5:
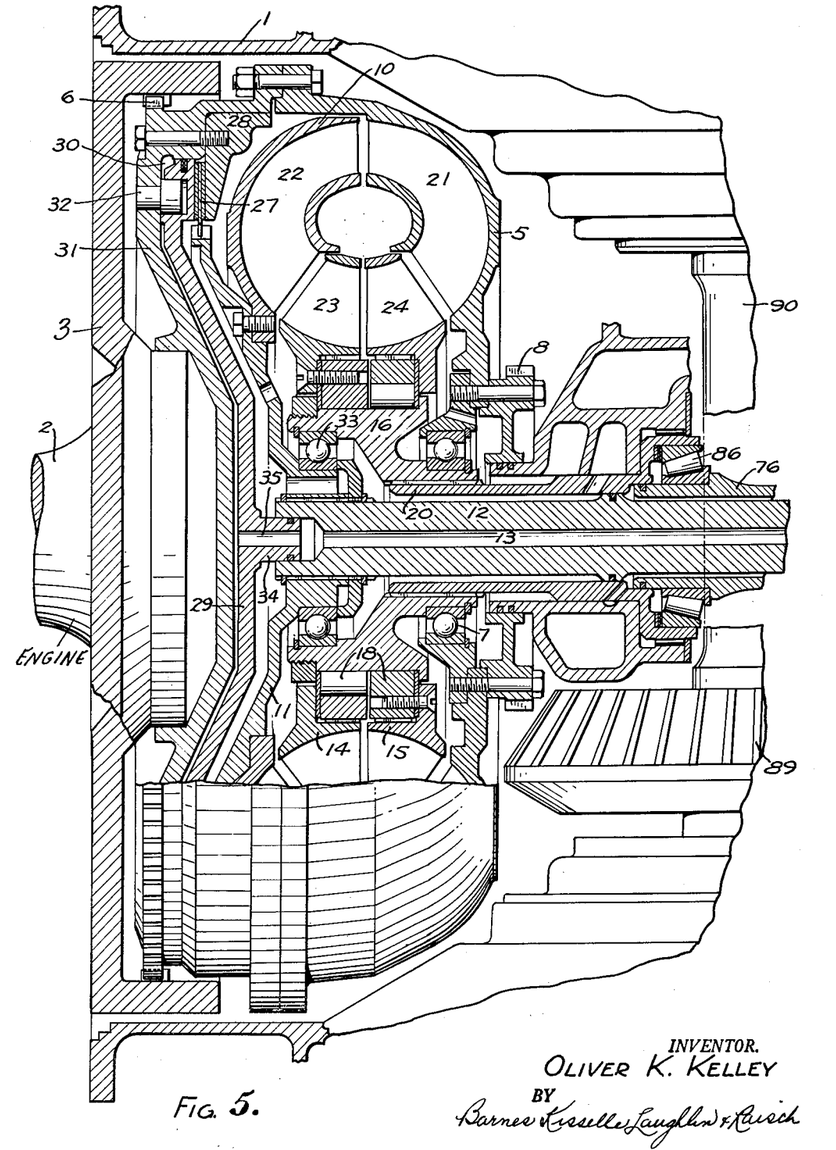
FIG. 5 is an axial sectional view of one form of actual structure of the fluid torque converter, the lock-up clutch and other related parts taken substantially on line 5—5 of FIG. 2.

The planetary gearing associated with the converter output shaft 12 is illustrated in FIG. 5. There is an intermediate ratio sun gear 40 mounted on the shaft 12 and meshing with planet gears 41, each mounted upon a shaft 42 and meshing with a reaction ring gear 43. Secured to the ring gear 43 is intermediate ratio brake drum 45, which can be held fast by a brake band 46. Also secured to the ring gear 43 is a cylinder 47 containing a piston 48. There is a clutch hub 50 spaced from the piston 48 and splined to the shaft 12.

A third speed or planetary lock-up clutch 51 has driven discs splined to the member 45 and driving discs secured to the hub 50. This clutch is engaged to lock-up the intermediate ratio gearset when oil under pressure is introduced into the cylinder 47 to urge the piston 48 to the left as FIG. 5 is viewed. Coil springs 52 normally hold the clutch 51 disengaged.

Figure 8:
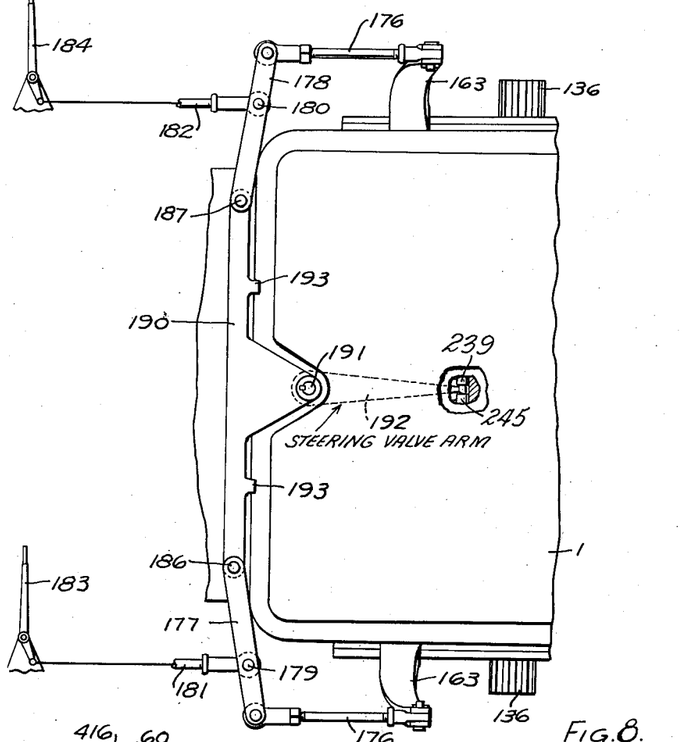
FIG. 8 is a view showing the braking and steering control arrangement to be manipulated by an operator.

The brake drum 45 may be held by the band 46 by means shown in FIG. 8. The band is held normally expanded by a spring 53. A lever 54 is mounted on a fixed pivot 55 which is carried by the case. Links 56 are also mounted on the pivot 55 and support the fixed end of the band 47. The lever 54 sets the band by a strut 57. The lever 54 is actuated by a rod 58 connected by a link 59 to a piston 60 in a cylinder 61. It will be seen that introduction of hydraulic medium under pressure into the cylinder 61 will swing the lever counterclockwise as FIG. 8 is viewed, thus contracting the band 46 and causing it to engage brake drum 45.

The carrier for the planet pinions 41 includes a flange 63 journalled on a bearing 64 and splined to a low ratio ring gear 65, at 66. An opposite and similar flange 67 is splined to gear 65 and to a reverse sun gear 68 mounted on a bearing 69.

A low ratio sun gear 70 is keyed to the converter output shaft and its teeth mesh with planetary pinions 71, the teeth of which mesh with those of the low ratio reaction ring gear 65. The pinions 71 are mounted on shafts 73 in a carrier constituted by a cheek 74 and a flange 75, which latter is splined to a transmission output shaft 76.

The reverse sun gear 68 has its teeth meshing with the teeth of planetary pinions 80 and the teeth of the pinions mesh with those of a reverse reaction ring gear 81. The pinions 80 are journalled on shafts 82 mounted in a cheek 83 and a carrier flange 84, splined to the output shaft 76, carried in a bearing 85 and a bearing 86 (FIG. 4) and secured to a bevelled gear 88 driving the bevel gear 89 on a cross shaft 90. Advantageously the gears 88 and 89 are of the hypoid type and require efficient lubrication and cooling. The cross shaft 90 and the shaft 76 are output shafts relative to the entire transmission. It is convenient to identify the shaft 12 and the sleeve 76 as input and output members, respectively, of the gearing.

The low ratio ring gear 65 has oppositely tapered conical brake surfaces. A brake member 95 splined as at 96 to the housing cooperates with one cone surface. A brake member 97 splined to the housing as at 98 cooperates with the other cone face. These two members are normally held in proper relationship with the ring gear 65 by holding rings both indicated at 100. The two braking elements 95 and 97 are normally held separated by coil springs 101 of which there may be several spaced circumferentially about. A low ratio establishing piston 102 is disposed in a cylinder 103 for actuating the brake element 95.

Similar braking elements 107 and 108 are associated with the oppositely coned surfaces of the reverse ring gear 81. These elements are splined to the housing as at 109 and 110, are held normally separated by springs 111 and are retained in position by retaining elements 112. A reverse-establishing piston 115 in cylinder 116 is arranged to operate the clutch element 107. The piston 102 and the brake element 95 are associated by thrust pieces 118 and the piston 115 is associated with the brake element 107 by thrust pieces 119.

When oil under pressure is delivered to the cylinder 103 the piston 102 shifts to the left as FIG. 5 is viewed. This causes the brake element 95 to engage one cone surface of the ring gear 65. Following this engagement the clutch element 95 and the ring gear 65 continue shifting to the left until the other cone surface engages the cone face of the brake element 97. The brake element 97 is backed up by an abutment member 120 so that it cannot shift to the left. Similarly, when oil under pressure is delivered to cylinder 116 piston 115 shifts to the right causing the brake element 107 to engage one cone surface of the ring gear 81. Then the ring gear 81 is shifted to the right causing the other cone surface to engage the brake member 108, the brake member 108 being backed up by the abutment member 120.

The result of this is that the ring gear 65 and the ring gear 81 may be engaged by the brake elements and held against rotation. In the action of engagement one of the brake members, for example, the clutch member 95, engages the ring gear 65 and the brake member and ring gear shift to the left, as FIG. 5 is viewed, until the ring gear comes into engagement with the brake member 97. The brake 97 provides the reaction necessary for complete engagement of the brake members 95 and 97 with the ring gear 65.

For second speed gear drive the ring gear 43 is held stationary by brake band 46. The sun gear 40 rotates in the same sense and speed as the turbine 10 and rotates the carrier 63—67 and the ring gear 65 to rotate in the same sense and at a lower speed. The pinions 71 are rotated by the sun gear 70 opposite to the turbine causing the pinions to revolve about the ring gear 65 in the same direction of rotation as the turbine. Because ring gear 65 is rotating in the same direction but at a lower speed than that of the sun gear 70, the carrier 74—75 revolves within the ring gear 65 at an intermediate speed and in the same direction; that is, intermediate the speed of rotation of the sun gear 70 and the ring gear 65. The member 75 is keyed to the output sleeve 76.

For third speed or direct drive through the gearing, the clutch 51 is engaged. Engagement of this clutch locks the ring gear 43 directly to the gearing input shaft 12 through the member 50. Thus, the sun gear 40, pinions 41, and ring gear 43 rotate in unison. This constrains the carrier 63—67, ring gear 65 and sun gear 70 also to rotate in unison and there can be no rotation of the pinions 71 on their shafts 73 with the result that the carrier member 75 transmits the torque to the output sleeve 76 at the same speed and in the same direction as that of the rotation of the shaft 12.

In low range the brake elements 95—97 hold ring gear 65. The sun gear 70 turns at low speed and this is transmitted to the output sleeve 86.

In reverse the brake elements 107—108 hold the ring gear 81. The sun gear 70 rotates pinions 71 forward on their axes 73, which are initially held by the resistance of the output shaft 76, and the pinions cause the ring gear 65 and sun gear 68 to rotate backward, and since ring gear 81 is held stationary the carrier 83—84, keyed to the output sleeve 76 drives the output sleeve 76 backward.

Figure 6:
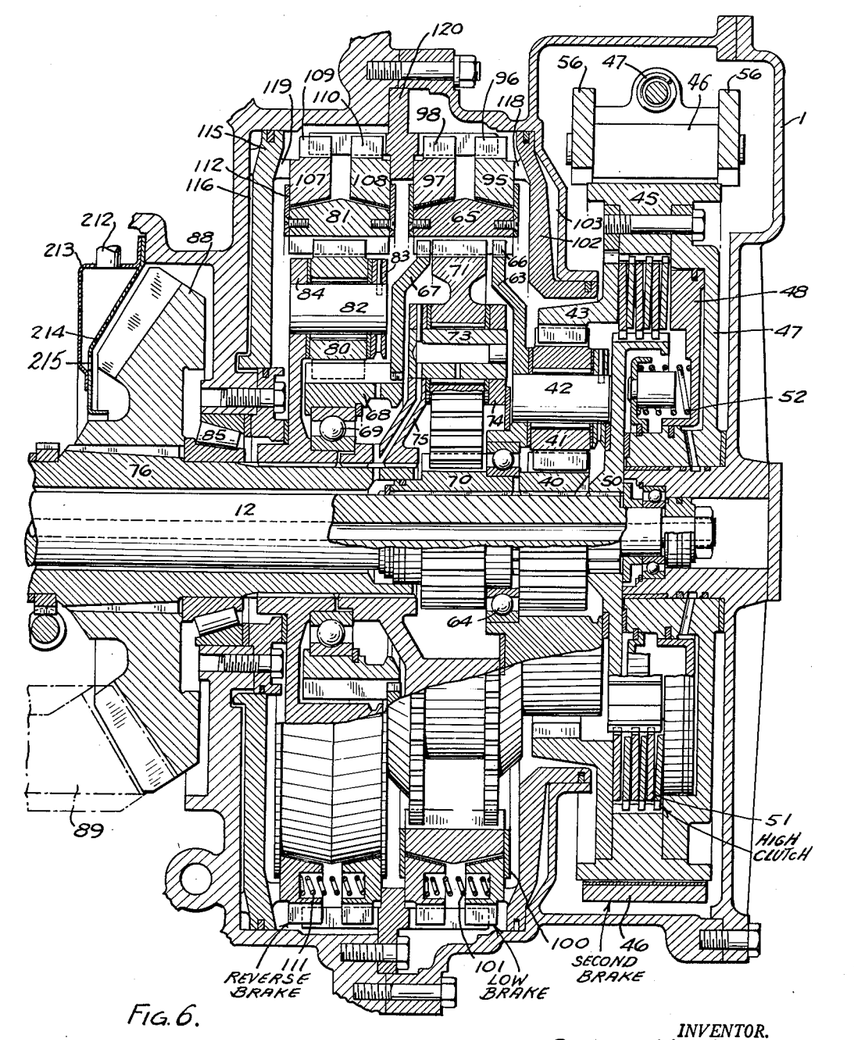
FIG. 6 is a sectional view taken through the part of the transmission located to the right of that shown in FIG. 5, showing the structure of the main driving gears and planetary change-speed gearing and the controlling clutches therefor and taken substantially on line 6—6 of FIG. 2.

The cross shaft 90 extends toward opposite sides of the vehicle and only one side is shown in detail in FIG. 6, it being understood that the arrangement at the opposite side is identical.

The cross shaft is journalled in a pair of bearings as 130, beyond which it extends as at 131. Keyed to each end portion 131 is a clutch hub 132. The clutch comprises multiple discs 133, the driving discs being splined to the hub 132 and the driven discs being splined to the flange portion 135 of a final drive shaft 136 which is adapted to receive a traction member or traction driving member. In the case of a track laying vehicle, the traction member to be received by the final drive 136 is a form of sprocket for driving the track. Keyed or otherwise secured to the flange 135 as at 138 is a hydraulic cylinder 140 within which is a piston 141 for engaging the clutch to connect the cross shaft 90 to the final drive member 136. Suitable springs 142 normally hold the clutch discs 133 disengaged. The cylinder member 140 has an extending sleeve 143 to which is attached the driving member of a pump 144L for hydraulic medium, the pump being completed by a pump housing member 145 secured to the casing 1.

Figure 2:
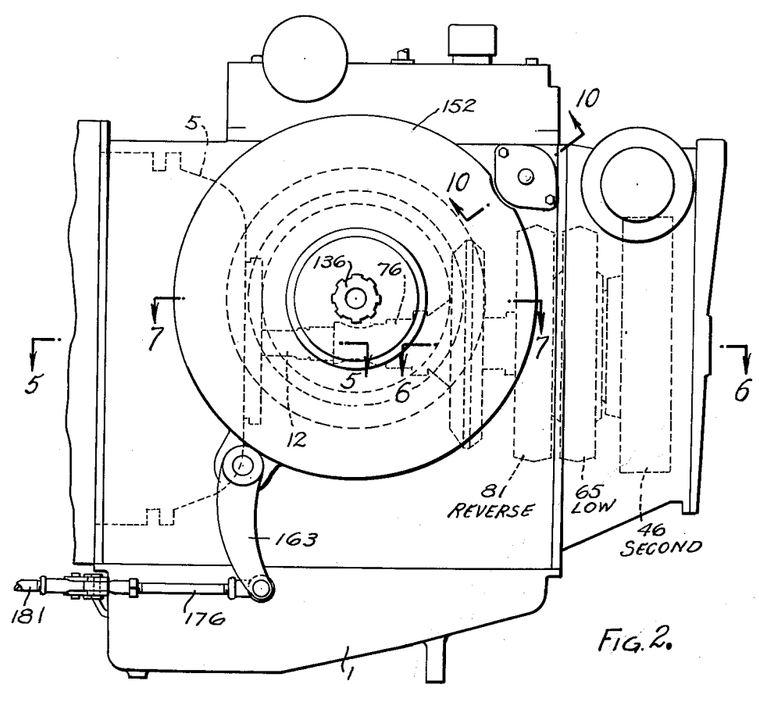
FIG. 2 is a side elevation of one form of actual structure of the transmission housing showing some of the inner structural parts in dotted lines and illustrating external control features.
Figure 3:
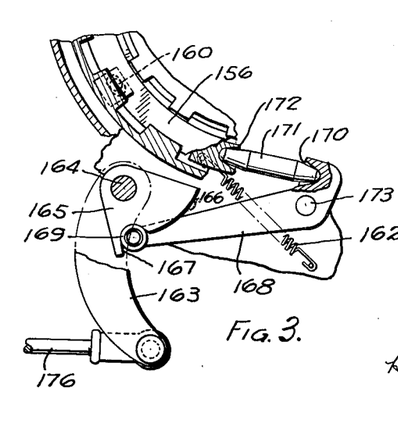
FIG. 3 is a detailed view partly in section illustrating a manual control for brakes.

A brake construction involves a multiple disc brake structure 150, driving discs of which are splined to the flange 135, as indicated at 151, and driven discs of which are splined as at 152 to a fixed brake housing 153 fastened to the housing 1. The brake structure is enclosed by a plate 154. This brake is arranged to be engaged by rotation of a cam ring 156, which also is a brake pressure plate. This is illustrated in FIGS. 2 and 3. The ring 156 has a plurality of circumferentially spaced angular or helical grooves 158. The brake housing 153 has a plurality of circumferentially spaced angular or helical grooves 159. The grooves 158 and 159 match each other and hold a ball 160. When the ring 156 is rotated relative to the brake housing, the balls serve to shift the ring 156 downwardly as FIG. 6 is viewed, to engage the brake 150. Each of the several balls in their matching grooves may be retained therein and enclosed by a plate 161.

As shown in FIG. 2, the brake ring 156 may be normally held retracted by a releasing spring 162. There is a brake on each side of the transmission and for manually operating each cam ring 156 there is a lever 163 fulcrumed at 164 and fixed to a cam element 165 with a cam surface 166 and a notch 167. Another lever 168, pivoted at 173 within the casing has a roller 169 for engaging the cam element 165. The lever 168 has a recess 170 for receiving one end of the strut 171, the opposite end of which is positioned in the recess 172 in one end of the cam ring 156. Normally, under the action of the spring 162 parts are in the position shown in FIG. 2 with the roller 169 seated in the notch 167. When the lever 163 is rocked clockwise as FIG. 2 is viewed, the cam surface 166 engages the roller, rocks the lever 168, causes the strut to shift the cam ring 156 clockwise. The cam action of the balls in the recesses 158 and 159 shifts the cam ring 156 downwardly as FIG. 6 is viewed to engage the brake 150. This ground brake structure is confined in a brake chamber 174 which has a sealing element 175.

Figure 7:
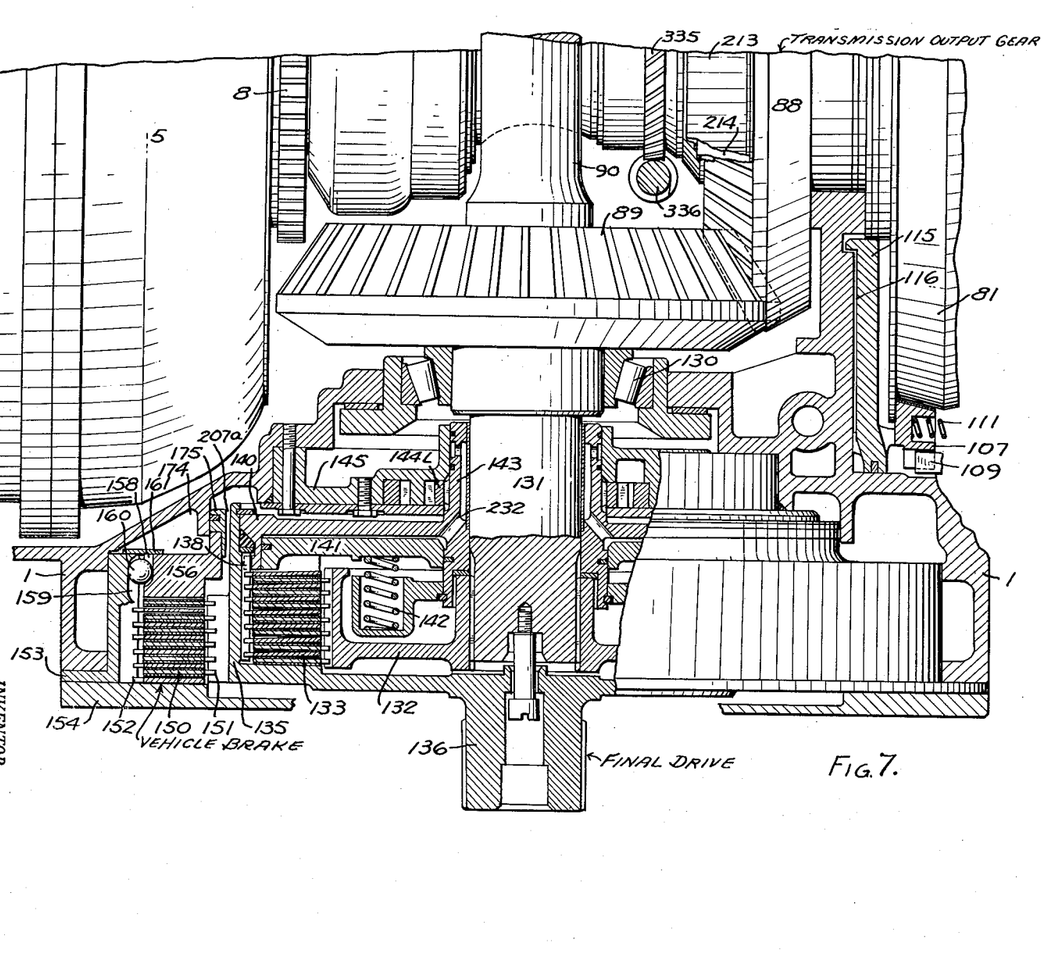
FIG. 7 is a view illustrating the structure of the cross drive shaft showing the controlling clutch arrangement at one output end of the drive shaft and taken substantially on line 7—7 of FIG. 2.

As shown in FIG. 7 the two levers 163 are operable by rods 176. One rod is connected to a link 177 and the other is connected to a link 178 and these links are connected to pivots 179 and 180 between their ends to link members 181 and 182, which are in turn connected respectively to steering and brake levers 183 and 184. The opposite ends of the links 177 and 178 are pivoted as at 186, 187 to a rocker arm 190 pivoted at 191 to the housing and keyed to a steering valve operating arm 192 the purpose of which will presently be seen. Projections 193 may strike the housing 1 to limit the rocking action of member 190.

Figure 9:
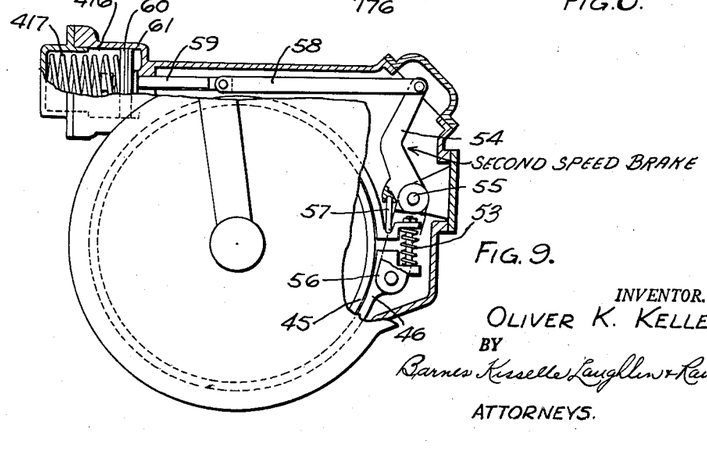
FIG. 9 is a detailed view partly in section of the brake band for establishing second speed drive.
Figure 10:
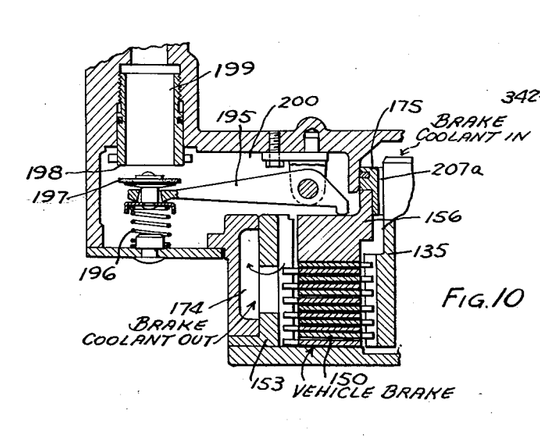
FIG. 10 is an enlarged sectional view taken substantially on line 10—10 of FIG. 2 illustrating part of the ground brake construction and showing the valving arrangement associated therewith.

Associated with each ground brake is a valve to supply cooling oil to the brake discs (FIG. 9). A lever 195 has one end abutting the brake pressure plate 156 and its other end carrying a valve 197 urged by a spring 196 to engage a seat 198, to close a vent passage 199 which leads to the intake of the brake cooling pump 202. Passage 199 communicates with the passage 200 which is in communication with the brake chamber 174. Passage 199 may actually open into the interior of the crank case. While the actual construction is illustrated in FIG. 9, the diagrammatic illustration of the system, in FIG. 10, shows the valve 197 in the form of a ball. This is merely for convenience. The brake chamber 174 may be open as shown at 201 in FIG. 10 (not shown in FIG. 9) for the discharge of the cooling oil. In FIG. 10, the same reference characters are used for the right and left ground brakes.

*Brake Cooling Control*

The pump system for hydraulic medium is diagrammatically illustrated in FIG. 10. There are four pumps for oil, 202, 210, 211, all driven by the gear 8 which is connected to the impeller 5 directly driven by the engine. There are two pumps 202 for pumping cooling oil to the two ground brakes. One pump and its system may be described, the other being the same. For supplying oil to the left hand brake, the pump has an inlet line 205 communicating with the sump 206, a pressure line 207 for conducting oil to the brake chamber and a branch inlet 208 which can be vented at 199 under control of valve 197. When the member 156 is retracted by its spring 163, with the ground brake disengaged, the cam ring rises as in FIG. 9 to unseat the valve 197 to open the port 199. Therefore, the pump 202, instead of drawing oil from the sump, merely pumps air through its inlet and through its outlet. Thus, in normal operation with the ground brake released, the ground brake pump 202 is not called upon to pump hydraulic liquid, reducing to a minimum wear on the pump parts and saving power. When the brake is applied the cam ring 156 shifts downwardly as FIG. 9 is viewed, which is a shift to the left, as the left hand ground brake, in FIG. 10, is viewed, and the valve member 197 closes the air bleed port 199. The pump then immediately draws oil from the sump and pumps it through the line 207 and clearance 207a (FIG. 9) through the ground brake chamber, cooling the discs and this oil is then discharged through the port 201.

Main Control

Other pumps driven by the gear 8 are a main input pump 210 with an inlet in the sump 206, and an auxiliary pump 211 with its inlet in what may be termed a scavenge area in the crank case. This area is a location where some oil collects and so hte pump 211 removes the oil therefrom. The pump 211 has an outlet line 212, and the pump 211 is for lubricating the bevel gears 88 and 89, by supplying a spray ring 213 (FIGS. 5 and 6) adjacent the face of the gear 88. This is of circular form, interrupted only at the gear 89. A plate 214 closes the ring on the side adjacent the teeth of gear 88 and it is provided with a plurality of apertures 215 for the discharge of oil directly onto the teeth of the gear 88. Thus, these bevel gears are efficiently lubricated and cooled. The outlet line 212 is illustrated diagrammatically in FIG. 5 as communicating into the manifold 213 although its position has been modified in order to show it in the drawing.

The left-hand, or wheel-driven pump, 144L has an inlet from the sump 206 and the right-hand output, or wheel-driven, pump is similar as shown in FIG. 10. Both the right and left-hand output pumps and the main input, or engine-driven, pump 210 connect into the main pressure line 220. One of the output pumps 144L and 144R pumps into the main pressure line when the vehicle is going forward and the other when the vehicle is backing. The action is controlled by a system of check valves. As indicated in FIG. 10, the vehicle may be considered as going forward and the pump 144L is pumping into the main pressure line through check valve 221 while check valve 222 is closed. The pump 144R is not pumping and its check 223 is closed while check valve 224 is open and the pump is circulating air or air with some oil therein, through the bypass 225. When the vehicle operates in reverse, pump 144R pumps oil into the main pressure line and 144L pumps air through the bypass 226.

This reverse pump arrangement supplies lubricating oil both when the vehicle is towed or pushed forward and backward with the engine not running. If the vehicle is towed backward the output pump 144R supplies sufficient oil to the system for keeping the parts lubricated. This arrangement is particularly adaptable and useful for military vehicles.

Steering Control

Figure 11:
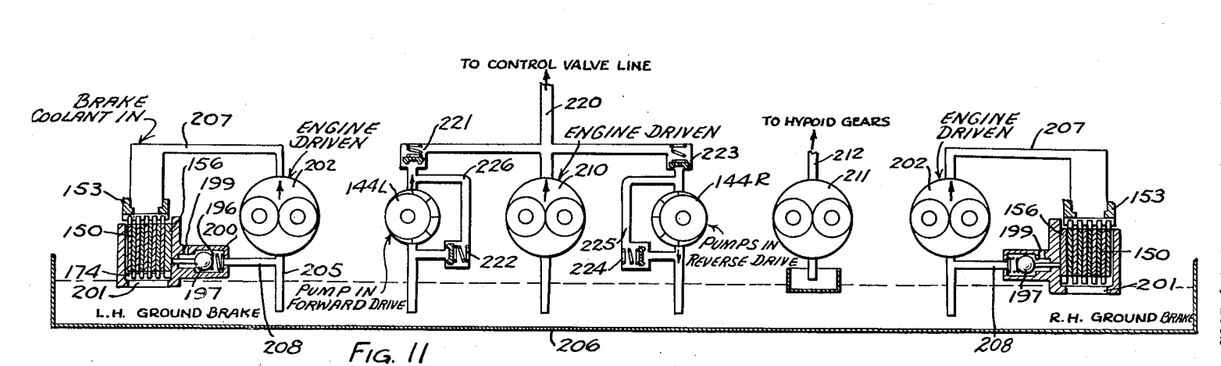
FIG. 11 is a diagrammatic view illustrating part of the hydraulic system.

The main pressure line has a branch 230 (FIG. 11) which extends to valves for controlling the right and left hand output clutches 133. Connecting into the left hand clutch control valve is a port 231 and leading therefrom is a line 232 which extends to the cylinder 140 (FIG. 6). Line 233 connects into the right-hand control valve and line 234 runs to the cylinder of right-hand output clutch. The left-hand valve 239 is held normally against a center stop 235 by a spring 236 and it has a port 237 which normally connects the lines 231—232. The left-hand valve has an exhaust port 238. The right-hand valve 245 is similarly constructed with a port 240, spring 241 and an exhaust port 242. The valve controlling arm 192 lies between the two valve members. As FIG. 11 is viewed, if the arm 192 is swung counter-clockwise, the connection between the lines 231 and 232 is closed and 232 is opened to the exhaust 238. As a result the left-hand output clutch 153 will become disengaged. Movement of the arm 192 clockwise will, in a similar manner, cause the right-hand output clutch to become disengaged.

This action is employed in the steering and manipulation of a track laying vehicle, and the action is coupled with the manual control of the right and left-hand brakes, the left-hand brake being shown at 150. The operator may apply both hands to the control levers 183—184 (FIG. 7) and if the operator applies equal force to both control members, the manual brakes are applied. This may be done to stop the vehicle in a straight line of movement. To turn the vehicle, for example, to the left, the operator applies more force to the lever 184. This causes the double crank lever member 190 to rock on its axis 191 thus shifting arm 192 counter-clockwise to close off the oil under pressure to the left hand output clutch. Thus, the brake 150 may be applied and the output clutch 133 disengaged, and the vehicle is turned to the left. The right-hand output clutch and the right-hand brake are similarly controlled by the right-hand valve.

Automatic Transmission Control

The main pressure line has a branch 250 which extends to a manual selector valve having a body 251 and a valve member 252 operable by a control member 253. This valve member has a head 254, a head 255 and a head 256. A groove 257 lies between heads 254 and 255. The valve may be shifted into one of five positions, as indicated by N, H, 2nd, L, R. The selector valve has an open end forming an exhaust port 259. It is shown in the neutral position in which main line 250 is blocked by heads or lands 254, 255. The next higher position is for high range automatic operation of the transmission in second and third-speed ratios; the next higher position locks the transmission in second speed ratio; the next higher position lock the transmission in the low speed ratio; the next higher position is for reverse. The valve body is connected to a pressure line 260 for the second and high speed ratios, to the pressure line 261 for the second speed ratio only, to the pressure line 262 for the low speed ratio, and to the pressure line 263 for reverse. The body has a line 264 connecting to a lock-up clutch valve 375. A segment 258 and a spring-pressed detent 259 holds the valve member in a selected position.

Associated with the manual control valve is a speed-responsive downshift inhibitor in the form of a plunger 266 with a piston 267 which can be moved down by governor pressure in the cylinder 268 against the force of a return spring 269 far enough to engage a secondary spring 270.

This inhibitor can cooperate with a stop 271 having an abutment face 272 and an abutment face 273 to prevent downshift movement of the manual valve operator 258 when the car is moving above a predetermined speed, as will be explained. The chamber 274 of the manual valve has a discharge port controlled by check valve 275 and a small bleed port 275a not controlled by the check valve.

The main pressure regulator is indicated generally at 280 and the main pressure line 220 connects into a regulated pressure chamber 281 thereof. The pressure regulator valve includes a valve stem 282 urged to the right by spring 289. The stem includes a governor piston 283, a main regulating land or piston 284, a converter charging land 285 functioning in a converter charging port 286 and a maximum pressure land 287 functioning in a maximum pressure relief port 288. The regulated pressure chamber 281 has a pressure relief valve 290 discharging ultimately to the torque converter and has a passage 293 leading to a pressure-regulating chamber on the right of land 284, while the port 286 lies between the regulated pressure chamber 281 and a reduced pressure converter supply chamber 294. To maintain high line pressure at low speed, passage 295 extends from the regulated pressure chamber 281 to a low speed booster chamber 295a on the left of the small end of a piston 296 so that pressure in chamber 295a can urge the valve stem 282 to the right to increase pressure in the main line through a pin 297 slidable in end wall 298, when this is permitted by low governor pressure in the chamber between the large end of piston 296 and end wall 298, as will be explained. Leading from the chamber 294 is a reduced pressure torque converter supply passage 300 provided with a relief valve 301 and also provided with a restricted converter supply port 302 leading to the converter inlet passage 304. A second restricted passage 305 connects the converter supply passage 300 with a cylinder 306 of a converter pressure regulator valve.

As is known to those versed in the art, a circulation of oil is maintained in the converter particularly when it is used to transmit torque and the oil from the converter discharges into a passage 310 which leads to a converter flow valve 311 having an exhaust port 312. The flow valve 311 is urged by a spring 311a to close the inlet end of the conduit 304 and in this position it has ports 313 and 314 which connect the converter discharge conduit 310 with the exhaust 312.

In the converter discharge passage 310 is a pressure relief valve 315 which can connect to the discharge line 316. The line 316 continues past the relief valve 301 into the cylinder 306 which can discharge to a cooler and lubricating lines through a port 317 controlled by a head 318 on the stem of a converter regulator and cooler bypass valve generally indicated at 320 which stem is urged to the left by a head 321 acted upon by liquid entering the cylinder 306 and is normally urged to the right as FIG. 11 is viewed by a primarily acting coil spring 322 and a secondary spring 323 which backs up a headed member 324. This valve stem also has a head 327 operating in a port lying between a passage 316a and a lubricant passage 328 which leads directly to a transmission lubricant line 330. This lubricant line has a pressure relief valve 331 to maintain a relatively low pressure therein. The line 316a continues around the head 287 and into line 316b where it enters the cooler which discharges into the lubricant line 330. There is a bypass 332 extending around the cooler which may be controlled by a valve 333.

Figure 12:
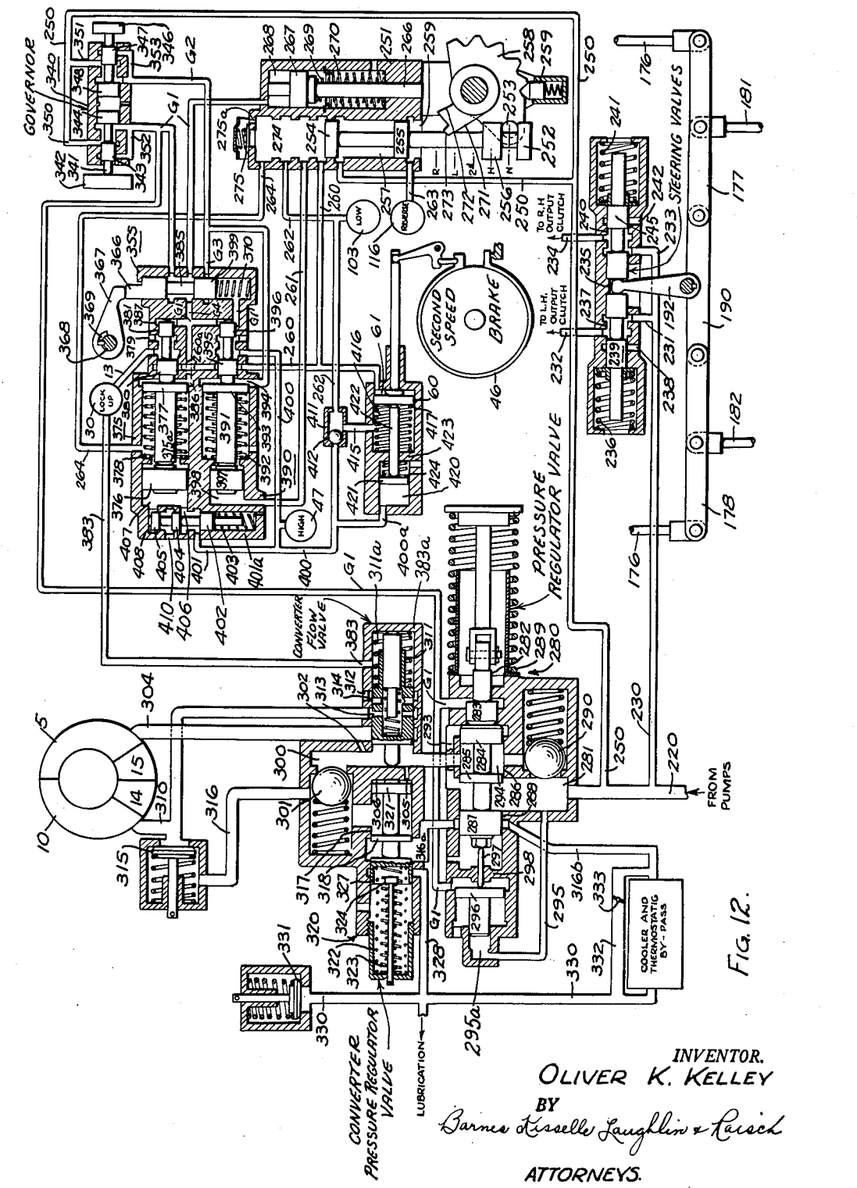
FIG. 12 is a diagram of the hydraulic control system illustrating the structure of some of the mechanical parts and valves.
Figure 13:
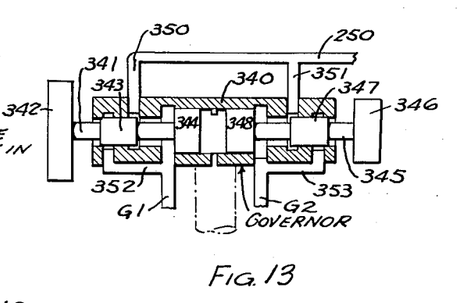
FIG. 13 is a view of diagrammatic nature showing the structure of a centrifugal governor valve.

For controlling changes of ratio there is an output shaft driven governor 340 (FIGS. 6, 11) which may be of known construction, such as the governor in FIG. 5 of the Thompson U.S. Patent 2,204,872. The governor is rotated by shaft 336 driven by worm gear 335 on the output sleeve 76 (FIG. 6). A low speed valve 341 is urged out or to the left as FIG. 12 is seen by a relatively large centrifugal weight 342 and is urged in by the pressure on a large land 344 of oil in passage $G_1$ to which oil is admitted from passage 350 (connected to main line 250) under the control of small land 343. The pressure in passage $G_1$ is maintained as a function of governor speed jointly by the admission of oil from line 250 and exhaust of oil through passage 352 as is known. Likewise, a lower pressure at a given speed of rotation is maintained in high speed passage $G_2$ by high speed valve 345 urged outward by a small weight 346 and urged inward by pressure on head 348 maintained jointly by admission of oil from line 351 (connected to main line 250) and exhaust of oil through passage 353 both under control of land 347.

There is a throttle actuated valve 355 with a grooved valve stem 366 which can be urged down, as FIG. 11 is seen, by an arm 367 fixed to the engine throttle shaft 368 through a loose or lost motion connection illustrated at 369. The stem 366 is urged up by a spring 370. The pressure line $G_1$ passes through this valve as shown to shift control valves to be described and to the downshift inhibitor 251. Pressure line $G_1$ also goes to the main pressure regulator valve to urge the head 283, and the head 296 to the left, tending to reduce main line pressure.

There is a converter lock-up clutch valve generally indicated at 375, having a valve stem 375a which can be urged to the right by a piston 376 under the influence of control pressure, as will be explained. The stem 375a has a piston 377 and a relatively large land 380 and a relatively small land 381, all urged to the right by spring 378. The lock-up clutch release line 264 can conduct line pressure from the manual valve 252, when in reverse, to the space at the left of piston 377 to prevent the engagement of the lock-up clutch, as will be explained. The second and high speed pressure line 260 has a branch 260a which leads into the lock-up valve at the location of land 380 and is normally closed thereby. Leading from the lock-up clutch valve 355 is the line 13 in the converter output shaft 12, which extends to the cylinder 30 of the lock-up clutch. The valve has an exhaust port 379. Extending from the cylinder 30 of the lock-up clutch to the converter flow valve 311 is a line 383 which restricts flow through the converter when the lock-up clutch is engaged, as will be explained.

The pressure line $G_1$ passes around neck 385 in the throttle actuated valve 366 and thence to chamber 386 in the lock-up clutch valve 355 so as to act upon the piston 377 to open the valve and engage the clutch at high vehicle speed as will be explained. The line $G_1$ also has a branch which passes into a chamber 387 in the clutch lockup valve to act upon the head 381 thereof.

There is a gear shift valve generally indicated at 390, having the valve member 391 urged closed, or to the right by springs 392 and it has a governor piston 393 adjacent a governor chamber 394. It also has a land 395 at the location where the line 260 enters the shift valve and a smaller land 396, defining a governor ($G_1$) pressure chamber.

The shift valve can be held closed to prevent upshifting of the planetary gearset by control pressure at the left of a piston 397 in a third speed lock-out chamber 398 which can be supplied with oil at main line pressure by line 261 from chamber 274 of the manual valve 252 when in second speed position marked $2^d$. The pressure in line $G_1$ tends to open the shift valve by acting upon the head 396. The line $G_1$ also extends into the throttle actuated valve on the underside of the head 399 thereof.

The line $G_2$ extends to the throttle actuated valve and into the upshift chamber 394 of the shift valve 390.

There is a high clutch actuating line 400 which connects into the shift valve between the two heads 395 and 396 and when the shift valve is open this line 400 fills the high clutch cylinder 47. From the high clutch cylinder 47 line 401 leads to a pressure-limiting valve 401a for urging the lock-up clutch valve 375 closed with a limited force. The pressure-limiting valve has a valve stem with a head 402 urged closed by a spring 403. The stem also has a head 404 and a head 405. The limiting valve has a port 406 which leads from line 401 into a cylinder 407 in which the piston 376 is disposed. Connected to the cylinder 407 is a pressure-limiting chamber 408 disposed above land 405. The pressure limiting valve has an exhaust port 410.

The pressure limiting valve is a regulator valve in which the pressure in chamber 407 passes into chamber 408 and urges head 405 down against the force of spring 403. Thus, an excessively high pressure in the chamber 407 causes the head 404 to close inlet port 406 and to open exhaust port 410 and the pressure in chamber 407 is thus limited by the force of spring 403.

The line 400 also leads to a shuttle valve having a body 411 with a ball valve 412 therein. The line 262 for the low speed range also extends to the shuttle valve on the opposite side of the ball member 412. A passage 415 connects the interior of the shuttle valve with a second speed release chamber 416 in the cylinder 61 on the left side of the piston 60. The piston 60 is urged in the band-releasing direction by a spring 417. A branch 400a of the high clutch line 400 connects into a second release cylinder 420 in which there is a piston 421 with a piston rod 422 extending through the end 423 of the cylinder 420 to engage the piston head 60. A spring 424 acts upon the piston head 421.

Operation of Control

Assume that the engine is idling with the manual valve in the position N shown in FIG. 11 which is neutral. The main input pump 210 is pumping oil into the high pressure line 220 and its branches 230 and 250. The brake coolant pumps are operating but if the brakes are not applied the inlets to these pumps are opened so that the pumps merely draw air. The scavenge pump 211 is operating for supplying cooling lubricant to the bevelled gears. The oil under pressure flows to the manual valve, but is prevented by piston heads 254 and 255 from actuating any of the clutches or brakes which could establish drive through the gearing. The oil from the main inlet pump 210 passes into chamber 281 of the main pressure regulator valve 280 and through passage 293 to the right side of the head 284. This urges the valve stem 282 to the left and, at a pressure determined by the spring 289, causes the head 285 to crack port 286 so that oil enters the chamber 294 and converter supply chamber 300, from which a limited amount of oil may initially pass through the port 302 into the inlet 304 of the torque converter, and discharge from the torque converter outlet line 310 through ports 313 and 314 to exhaust port 312. At this time the pressure in the converter may be relatively low and the rate of flow through the converter is minimized. This depends on idling speed of the engine, viscosity of the oil, capacity of the pump 210 and leakage from the system. Ordinarily at idling speed, the pump 210 maintains normal converter pressure, as it must to assure lubrication of the planetary gears, as will be explained. As converter pressure becomes established in chamber 300 by the main regulator valve 282, the pressure moves the converter flow valve 311 to the right, closing the converter outlet at port 313 and opening the communication between chamber 300 and the converter inlet 304. The oil under converter pressure also enters the cylinder 306 through restricted passage 305 and moves the converter regulator and by-pass valve 318 to the left opening port 317. Oil at converter pressure lifts the check valve 315 off its seat and flows through pipe 316 and open port 317 to the lubricating passage 316a from which it flows around land 287 of the main regulator valve and through the cooler to the lubricating line. It is obviously necessary for the converter regulator valve 318 to open port 317 in order to supply any lubricating fluid to the various bearings and gearing, which must be kept lubricated whenever the engine is running, because shaft 12 and all the gears are turning.

It will be noted that the outlet for the converter is controlled by the pressure on the inlet side. With this arrangement undue pressure cannot be built up within the converter. Should the cooler become clogged, that is, tending to build up the pressure, the converter outlet regulator valve shifts further to the left due to the built up pressure in chamber 306 and the head 327 will then open the passage 316a to a bypass line 328 which leads directly to the lubrication line 330. The normal maximum opening of the converter outlet regulator valve is determined by the spring pressed head 324. Clogging of the cooler will raise the pressure and then the converter outlet regulator valve member will shift further to the left against the spring 323 thus opening the port 317. Thus the mechanism will continue to operate if for some reason the cooler is clogged or otherwise cut out of the system. Also, if necessary, if the cooler becomes defective, disabled or clogged the valve 333 may be opened for bypassing the oil around the cooler through line 332.

Oil at main line pressure enters through line 295 into the chamber 295a at the left end of the pressure regulator to urge the piston 296 to the right. The main pressure regulator valve member is thus urged in opposing directions, namely, by the oil under pressure back of piston 284 which tends to decrease line pressure and by the pressure acting on piston 296, assisting spring 289 to increase pressure.

To drive the car in automatic range the operator shifts the manual control valve one notch upwardly into the H position for second and high speed ratios. The groove 257 now connects the pressure line with the line 260 which leads to the cylinder 61 for second speed apply piston 60; it runs through the shift valve 390 and to the lock-up clutch valve 380. The oil under pressure flows to the chamber 61, shifts the piston 60 to the left and contracts the second speed clutch band 46 on the member 45 and conditions the gearing to transmit torque through the second speed ratio. If the throttle is opened enough for the engine to develop sufficient torque we now have the vehicle moving and the governor valve is being rotated. When sufficient car speed is attained, the low speed governor valve 341 has raised the pressure in the line $G_1$ high enough to shift the lock-up clutch valve 375a to the left as FIG. 12 is viewed, which connects the pressure line 260a to the lock-up clutch line 13 so that the oil is conducted to the lock-up clutch cylinder 30 and the lock-up clutch begins to engage. The line 383 extends from the lock-up clutch cylinder 30 to the space in the cylinder 383a at the right of converter flow valve plunger 311, entering through port 383. As the lock-up clutch engages the converter flow valve is shifted to the left, thus reducing supply of oil to the converter to the minimum flow of oil through port 302. This is done because the torque is now transmitted directly through the lock-up clutch and not through the converter. Of course, governor valve 345 may open line $G_2$ to the pressure line 250 but this maintains a lower pressure in $G_2$ than the pressure in the line $G_1$.

As the vehicle accelerates still more, increasing pressure in the lines $G_1$ and $G_2$ moves the shift valve 391 to the left. Upon this occurrence the head 395 connects the line 260 to the line 400 which leads to the high clutch cylinder 47 and begins to engage the clutch 51. From the cylinder 47 the line connects to the shuttle valve 411 holding ball valve 412 to the right so that the oil under pressure passes into the second speed release chamber 416. The oil from line 400 also passes through line 400a into an auxiliary release chamber 420 to act upon the piston 421. This causes the piston 60 to move to the right against the pressure in chamber 61 to begin disengagement of the second speed ratio brake band 46.

At the same time, that is, during the shift from second to high, the lock-up clutch is disengaged and the converter restored to action. This occurs because line 401 conducts oil under pressure from line 400 to the pressure limiting valve 401a in which the oil flows between the heads 402 and 404 and through port 406 to establish in the chamber 407 a reduced or limited pressure, as explained above. This overcomes governor pressure and moves the valve stem 375a to the right, closing the connection between the pressure line 260 and the lock-up clutch pressure line 13 and opening the line 13 to the exhaust 379. This, of course, removes the pressure in line 383 so that the pressure is relieved from the converter flow valve 311 and the pressure in chamber 300 shifts the converter flow valve to the right to thus establish a wide connection between chamber 300 and the converter inlet 304.

Therefore, it will be seen that during the shift the lock-up clutch is disengaged and torque is transmitted through the converter and this softens the action of the shift in the releasing of one friction device and engaging of the other.

Bear in mind that at this stage of the operation, the torque converter is transmitting the torque. Upon further increase of speed, the pressure in the line $G_1$ further increases to overcome the limited pressure in chamber 407 and shifts the clutch lock-up valve back to the left again to set the lock-up clutch and to reduce the flow of oil through the converter.

In a downshift from high to second the operation is just the reverse. As car speed drops the pressure in line $G_1$ drops and the lock-up clutch valve is shifted to the right by pressure in chamber 407, to restore the converter to action. Further, reduced governor pressure also allows the shift valve 391 to shift back to the position shown in FIG. 11, thus cutting off supply of oil to the high clutch line 400 and venting clutch 47, chamber 407 and release chambers 416 and 420 to disengage third speed and establish a second speed.

At this point, it is well to note that the lock-up clutch valve has heads 380 and 381 of different size. Therefore, when this valve member has been opened, at a particular governor pressure, to establish a connection between line 260 and line 13, the greater force of the pressure on head 380 than on head 381 holds the valve open until the pressure in the line $G_1$ is lower than the above certain pressure, which represents a lower speed. Thus, for example, the lock-up clutch valve may open under pressure in line $G_1$ representing fifteen miles an hour, but will not close until there is a vehicle deceleration to say 11 or 12 miles an hour. These figures are exemplary only. Likewise the shift valve 391 has different sized heads 395 and 396 so that once it is opened it remains open until there is a substantial drop in the pressure in lines $G_1$ and $G_2$. This, of course, means a drop in vehicle speed.

If it is desired to operate the vehicle constantly in the second speed ratio the manual valve 252 is placed in the position marked $2^d$ in FIG. 11. This merely opens the shift valve lock-out line 261 to the main line 250 and pressurizes the chamber 398 at the left end of the shift valve and prevents the valve from opening under any circumstances.

To operate in the low speed ratio the operator shifts the manual valve to the L position of FIG. 11. This connects the main line 250 to the line 262 which leads to the low ratio cylinder 103 to engage the low brake. But, the second speed brake band 46 must be released. For this purpose, line 362 extends to the shuttle valve 411, passes into the same shifting the ball 412 to the left to close the line 400 so that the high clutch cannot be set. The oil thus flows through the shuttle valve line 415 and into second speed release chamber 416. Since the piston 60 is unbalanced, because of the spring 47, the combined load of the spring and oil pressure in chamber 416 shifts the piston 60 to the right as FIG. 11 is viewed thus disengaging the low speed brake band.

To operate in reverse the manual valve is shifted upwardly another notch to the reverse position marked R. At this time the head 255 lies between the connections of the line 250 and the line 260 and thus closes the main pressure line 250 off from the chamber 274. Thus, there is no pressure in lines 260, 261 or 262. These lines are vented through the check valve 275 and port 275a. At this time the head 256 closes the port 259 and a connection is established from line 250 into line 263 for conducting oil to the reverse speed ratio brake cylinder 116.

The inhibitor prevents the operator from manually downshifting at too high speed. For example, when operating in high speed ratio and at a high vehicle speed, the plunger 266 is shifted downwardly against both of the springs 269 and 270 and it blocks against the face 272 to prevent shift to second speed at such a high vehicle speed. When operating in locked second speed ratio the face 273 is in position to be blocked by the plunger 266 and thus a shift cannot be made to low speed ratio at too high a vehicle speed. The spring 269 acts on the plunger 266 at all times but when the pressure in the line $G_1$ increases the head 267 picks up the auxiliary springs 270.

It will be noted that the line 264 extends from the chamber 274 of the manual valve to the lock-up clutch valve so as to act upon the head 377 in a direction reverse to that of the action of the pressure in line $G_1$. This helps release the lock-up clutch. For example, when operating in low the head 254 is in a position above the line 262. In shifting from low to second, the head 254 moves to a position between line 261 and line 262 and line 262 vents through the restricted port 275a and the check valve 275 with its larger port. This retards the bleeding pressure and the pressure is transferred to the low lock-up clutch valve to help shift it to release the lock-up clutch and restore the converter for the shift from low to second.

The arrangement of having pressure from the governor valve in line $G_1$ active upon the main pressure regulator valve, serves to reduce the main line pressure with increase of speed in normal operation to thus save expenditure of power. At a relatively high speed of operation the pressure in line $G_1$ increases and is active upon the piston 296 and due to the different-sized piston areas the main line pressure on the left side of the pressure regulator valve member is relieved. Thus, the governor pressure on the head 283 urges the valve member to the left with greater effect than before so that the main line pressure is reduced as speed increases.

There is an overcontrol or kick-down effected by the throttle actuated valve 355. The shaft 368 turns with the throttle controlling mechanism, and after predetermined opening of the throttle, the key engages the end of the slot 369 and rocks the lever 367 clockwise as FIG. 12 is seen. The key and slot is merely diagrammatic of any suitable lost play connection. This pushes the valve member 366 against its spring and closes the connection in line $G_1$ between the governor valve and the lock-up clutch chambers 386 and 387 and the space on the right of land 396 of the shift valve 390. The neck 385 establishes a connection between the line $G_2$ through port $G_3$ and said chambers 386, 387 and space behind land 396. By thus reducing the pressure effective to hold the clutch lock-up valve open the lock-up clutch valve can be closed by the spring 378 and pressure in chamber 407. Therefore, by way of example, if the vehicle be operating in the high speed ratio, with the lock-up clutch engaged and the throttle is then widely opened, the lock-up clutch is released, restoring transmission of torque through the torque converter without any change in the speed range in the gearing of the transmission. This increases the over-all torque ratio of the transmission to provide acceleration in an emergency, for example. If thereafter car speed increases enough, increased governor pressure in line $G_2$ acting in chambers 386 and 387 can open the lock-up clutch valve to set the lock-up clutch again.

To briefly reiterate the overall action, the operator can make a selection in the operation of the manual valve. When a shift is made from one speed ratio to another and during the course of the shift the lock-up clutch disengages and the torque converter is restored to action. The shift is thus made with torque transmitted through the torque converter which softens and smooths the function. Thereafter the torque demand on the transmission may be reduced, as indicated by increasing car speed, and the lock-up clutch engages. Then, too, as is stated above when operating with the lock-up clutch engaged with a widely open throttle, the lock-up clutch can be manually disengaged and the torque converter restored to action to provide increased torque.

The steering of the vehicle is accomplished in a simple manner by combined and cooperative control of the vehicle brakes and the output clutches. By pulling evenly on the two levers 183 and 184 the brakes are applied. By pulling unevenly the driving clutches for the final drive members are selectively released or caused to slip. The double coned clutches soften the clutching action in making a gear shift. While operating constantly, the engine operated pumps for the cooling of the brakes, merely draw air when brakes are not applied thus resulting in saving of power. Moreover, the main line pressure is reduced in a normal high speed operation thus further saving expenditure of power.

I claim:

1. A transmission comprising in combination a driving shaft connected to the impeller of a hydrodynamic torque-transmitting device which has a turbine connectible through step-ratio gearing to a driven shaft, a lock-up clutch for connecting the turbine to the impeller, means responsive to increase in speed of rotation of the driven shaft for setting the clutch, means responsive to further increase of speed of the driven shaft for decreasing the torque ratio of the gearing, means responsive to initiation of change of torque ratio of the gearing for releasing the clutch, and means responsive to still further increase in speed of the output shaft for re-engaging the lock-up clutch.

2. A transmission comprising in combination a driving shaft connected to the impeller of a hydrodynamic torque-transmitting device which has a turbine connectible through step-ratio gearing to a driven shaft, a lock-up clutch for connecting the turbine to the impeller, a source of pressure fluid, a pressure-operated lock-up motor which when pressurized engages the clutch, a lock-up valve which when open pressurizes the lock-up motor and when closed vents the lock-up motor, means for establishing one torque ratio in the gearing, a pressure-operated gear shift motor which when pressurized establishes a second torque ratio in the gearing, a gear shift valve which when open pressurizes the gear shift motor and when closed vents the shift motor, means responsive to one predetermined speed of rotation of the driven shaft for opening the shift valve, means responsive to opening of the shift valve for closing the clutch valve, and means responsive to a second predetermined speed of rotation of the driven shaft for opening the clutch valve.

3. A transmission comprising in combination a driving shaft connected to the impeller of a hydrodynamic torque-transmitting device which has a turbine connectible through step-ratio gearing to a driven shaft, a lock-up clutch for connecting the turbine to the impeller, a source of pressure fluid, a pressure-operated lock-up motor which when pressurized engages the clutch, a lock-up valve which when open pressurizes the lock-up motor and when closed vents the lock-up motor, means for establishing one torque ratio in the gearing, a pressure-operated gear shift motor which when pressurized establishes a second torque ratio in the gearing, a gear shift valve which when open pressurizes the gear shift motor and when closed vents the shift motor, means responsive to one predetermined speed of rotation of the driven shaft for closing the lock-up valve, means responsive to a second predetermined speed of rotation of the driven shaft for closing the shift valve and means responsive to closing of the shift valve for opening the lock-up valve.

4. A transmission comprising in combination a driving shaft connected to the impeller of a hydrodynamic torque-transmitting device which has a turbine connectible through step-ratio gearing to a driven shaft, a lock-up clutch for connecting the turbine to the impeller, a source of pressure fluid, a pressure-operated lock-up motor which when pressurized engages the clutch, a normally closed lock-up valve which when open pressurizes the lock-up motor and when closed vents the lock-up motor, means for establishing one torque ratio in the gearing, a pressure-operated gear shift motor which when pressurized establishes a second torque ratio in the gearing, a normally closed gear shift valve which when open pressurizes the gear shift motor and when closed vents the shift motor, a governor which maintains a fluid pressure which is a measure of the speed of rotation of the driven shaft, a first fluid pressure valve motor connected to the governor which opens the lock-up valve at one speed of rotation of the driven shaft, and a second fluid pressure valve motor connected to the governor which opens the shift valve at a different speed of rotation.

5. A transmission comprising in combination a driving shaft connected to the impeller of a hydrodynamic torque-transmitting device which has a turbine connectible through step-ratio gearing to a driven shaft, a lock-up clutch for connecting the turbine to the impeller, a source of pressure fluid, a pressure-operated lock-up motor which when pressurized engages the clutch, a normally closed lock-up valve which when open pressurizes the lock-up motor and when closed vents the lock-up motor, means for establishing one torque ratio in the gearing, a pressure-operated gear shift motor which when pressurized establishes a second torque ratio in the gearing, a normally closed gear shift valve which when open pressurizes the gear shift motor and when closed vents the shift motor, a governor which maintains a fluid pressure which is a measure of the speed of rotation of the driven shaft, a first fluid pressure valve motor connected to the governor which opens the lock-up valve at one speed of rotation of the driven shaft, a second fluid pressure valve motor connected to the governor which opens the shift valve at a different speed of rotation, a third fluid pressure valve motor which when pressurized urges the lock-up valve to close, and means responsive to opening of the shift valve for pressurizing the third valve motor.

6. A transmission comprising in combination a driving shaft connected to the impeller of a hydrodynamic torque-transmitting device which has a turbine connectible through step-ratio gearing to a driven shaft, a lock-up clutch for connecting the turbine to the impeller, a source of fluid under pressure, means for regulating the pressure of the source, a pressure-operated lock-up motor which when connected to the source engages the clutch, a normally closed lock-up valve which when open connects the lock-up motor to the source and when closed disconnects the lock-up motor from the source and vents the lock-up motor, means for establishing one torque ratio in the gearing, a pressure-operated gear shift motor which when connected to the source establishes a second torque ratio in the gearing, a normally closed gear shift valve which when open connects the gear shift motor to the source and when closed disconnects the gear shift motor from the source and vents the shift motor, a governor including a reducing valve which maintains a pressure less than the pressure of the source, which reduced pressure is a measure of the speed of rotation of the driven shaft, a first fluid pressure valve motor connected to the governor which at one predetermined speed of rotation of the driven shaft opens the lock-up valve, a second fluid pressure valve motor connected to the governor which at another predetermined speed of rotation opens the shift valve, a third fluid pressure valve motor which when pressurized urges the lock-up valve to close with a force proportional to its pressure, means responsive to opening of the shift valve for connecting the third valve motor to the source, and pressure limiting means for reducing below the pressure of the source the maximum pressure in the third valve motor.

7. A transmission comprising in combination a driving shaft connected to the impeller of a hydrodynamic torque-transmitting device which has a turbine connectible through step-ratio gearing to a driven shaft, a lock-up clutch for connecting the turbine to the impeller, a source of fluid under pressure, means for regulating the pressure of the source, a pressure-operated lock-up motor which when connected to the source engages the clutch, a normally closed lock-up valve which when open connects the lock-up motor to the source and when closed disconnects the lock-up motor from the source and vents the lock-up motor, means for establishing one torque ratio in the gearing, a pressure-operated gear shift motor which when connected to the source establishes a second torque ratio in the gearing, a normally closed gear shift valve which when open connects the gear shift motor to the source and when closed disconnects the gear shift motor from the source and vents the shift motor, a governor including a reducing valve which maintains a pressure less than the pressure of the source, which reduced pressure is a measure of the speed of rotation of the driven shaft, a first fluid pressure valve motor connected to the governor which at one predetermined speed of rotation of the driven shaft urges the lock-up valve to open with a force proportional to governor pressure, a second fluid pressure valve motor connected to the governor which at another predetermined speed of rotation opens the shift valve, a third fluid pressure valve motor which when pressurized urges the lock-up valve to close with a force less than the maximum governor pressure and means responsive to opening of the shift valve for connecting the third valve motor to the source.

8. A transmission comprising in combination a driving shaft connected to torque-multiplying mechanism which drives a driven shaft at different torque ratios, torque ratio-changing control means which normally tends to increase the torque ratio of the multiplying mechanism, a governor connected to the driven shaft which maintains a first source of relatively high fluid pressure which is a measure of the speed of rotation of the driven shaft and maintains a second source of relatively low fluid pressure which also is a measure of the speed of rotation of the driven shaft, means for conducting fluid from the high pressure governor source to the ratio-changing control means to decrease the torque ratio of the transmission at a predetermined speed of rotation of the driven shaft, and means for interrupting the supply of high pressure governor fluid and conducting fluid from the low pressure governor source to the ratio-changing control means to decrease the torque ratio of the transmission.

9. A transmission comprising in combination a driving shaft connected to torque-multiplying mechanism which drives a driven shaft at different torque ratios, torque ratio-changing control means which normally tends to increase the torque ratio of the multiplying mechanism, a governor connected to the driven shaft which maintains a first source of relatively high fluid pressure which is a measure of the speed of rotation of the driven shaft and maintains a second source of relatively low fluid pressure which also is a measure of the speed of rotation of the driven shaft, means for conducting fluid from the high pressure governor source to the ratio-changing control means to decrease the torque ratio of the transmission at a predetermined speed of rotation of the driven shaft, and manually operable means for interrupting the supply of high pressure governor fluid and conducting fluid from the low pressure governor source to the ratio-changing control means to decrease the torque ratio of the transmission.

10. A transmission comprising in combination an engine connected to torque-multiplying mechanism which drives a driven shaft at different torque ratios, torque ratio-changing control means which normally tends to increase the torque ratio of the multiplying mechanism, a governor connected to the driven shaft which maintains a first source of relatively high fluid pressure which is a measure of the speed of rotation of the driven shaft and maintains a second source of relatively low fluid pressure which also is a measure of the speed of rotation of the driven shaft, means for conducting fluid from the high pressure governor source to the ratio-changing control means to decrease the torque ratio of the transmission at a predetermined speed of rotation of the driven shaft, and means responsive to a predetermined torque demand on the engine for interrupting the supply of high pressure governor fluid and conducting fluid from the low pressure governor source to the ratio-changing control means to decrease the torque ratio of the transmission.

11. A transmission comprising in combination a driving shaft connected to torque-multiplying mechanism which drives a driven shaft at different torque ratios, torque ratio-changing control means which normally tends to increase the torque ratio of the multiplying mechanism, a governor connected to the driven shaft which maintains a first source of relatively high fluid pressure which is a measure of the speed of rotation of the driven shaft and maintains a second source of relatively low fluid pressure which also is a measure of the speed of rotation of the driven shaft, means for conducting fluid from the high pressure governor source to the ratio-changing control means to decrease the torque ratio of the transmission at a predetermined speed of rotation of the driven shaft and means for interrupting the supply of high pressure governor fluid and effect an increase in the torque ratio of the transmission at one speed of rotation of the driven shaft, said last-mentioned means also conducting fluid from the low pressure governor source to the ratio-changing control means to decrease the torque ratio of the transmission to effect a decrease in the torque ratio of the transmission at a higher speed of rotation of the driven shaft.

12. A transmission comprising in combination a driving member connected to the impeller of a hydrodynamic torque-transmitting device having a turbine connected to an output member, a lock-up clutch which can connect the impeller to the turbine, a pump driven by the driving member for circulating liquid through the torque-transmitting device, means for selectively setting and releasing the lock-up clutch, a slow flow passage constantly connecting the pump to the torque-transmitting device, and a normally closed fast flow passage which can connect the pump to the torque-transmitting device, said transmission including fluid pressure means responsive to the pressure in the slow flow passage for opening the fast flow passage upon occurrence of a predetermined high pressure in the slow flow passage.

13. A transmission comprising in combination a driving member connected to the impeller of a hydrodynamic torque-transmitting device having a turbine connected to an output member, a lock-up clutch which can connect the impeller to the turbine, a pump driven by the driving member for circulating liquid through the torque-transmitting device, means for selectively setting and releasing the lock-up clutch, a slow flow passage constantly connecting the pump to the torque-transmitting device, a normally closed fast flow passage which can connect the pump to the torque-transmitting device, said transmission including fluid pressure means responsive to the pressure in the slow flow passage for opening the fast flow passage upon occurrence of a predetermined high pressure in the slow flow passage, and means responsive to setting the lock-up clutch for overcoming the fluid pressure opening means and closing the fast flow passage.

14. A transmission comprising in combination a driving member connected to the impeller of a hydrodynamic torque-transmitting device having a turbine connected to an output member, a lock-up clutch which can connect the impeller to the turbine, a pump driven by the driving member for circulating liquid through the torque-transmitting device, means for selectively setting and releasing the lock-up clutch, a slow flow passage constantly connecting the pump to the torque-transmitting device, a fast flow passage which can connect the pump to the torque-transmitting device, a fluid pressure motor for setting the lock-up clutch, a valve which can open and close the fast flow passage, means normally closing the valve, said transmission including fluid pressure means responsive to the pressure in the slow flow passage for opening the fast flow passage upon occurrence of a predetermined high pressure in the slow flow passage, said transmission also including a second fluid pressure means for closing the valve, and fluid connection between the second fluid pressure means and the lock-up motor for closing the valve when the clutch is set.

15. A transmission comprising in combination a driving member connected to the impeller of a hydrodynamic torque-transmitting device having a turbine connected to an output member, a lock-up clutch which can connect the impeller to the turbine, a fluid pressure motor for setting the lock-up clutch, a pump driven by the driving member for supplying liquid under pressure, means for regulating the pressure of the pump, means for selectively connecting the pump to the lock-up motor and disconnecting it therefrom, means including a supply space connected to the pump and an inlet passage connected to the torque-transmitting device for conducting liquid from the pump to the torque-transmitting device, means for maintaining in the supply space a pressure less than the regulated pressure of the pump, and control means for selectively opening and closing the inlet passage, said control means including means constantly tending to close the inlet passage, and including first fluid pressure means responsive to the pressure in the supply space for opening the inlet passage, and including second fluid pressure means for closing the inlet passage against the pressure of said first fluid pressure means, and including a fluid connection between the second fluid pressure means and the lock-up motor for closing the inlet when the lock-up clutch is set.

16. In a transmission, the combination of a drive shaft, a driven shaft, means for providing a first power train between said shafts including a hydrodynamic coupling device having a bladed driving element and a bladed driven element within a fluid housing, means for providing a second alternate power train between said shafts including a clutch and a fluid pressure operated piston within said housing acting against the fluid pressure in the housing to engage said clutch, means for circulating fluid through said hydrodynamic coupling device including a fluid inlet to said fluid housing, means for maintaining the fluid in said housing at a certain pressure when said first power train is completed, and means for reducing the pressure in said housing when said second power train is completed and including means forming a restriction in the fluid inlet of said hydrodynamic coupling device, means forming a second relatively unrestricted passage in parallel with said restriction, and a piston subject to the pressure of the fluid applied to said piston for said clutch for closing said parallel passage when clutch engaging fluid pressure is applied to said clutch piston.

References Cited in the file of this patent
UNITED STATES PATENTS

| | | |
|---|---|---|
| 2,162,785 | Neracher et al. | June 20, 1939 |
| 2,392,423 | Stephens | Jan. 8, 1946 |
| 2,503,497 | Le May | Apr. 11, 1950 |
| 2,642,972 | Brooks | June 23, 1953 |
| 2,645,137 | Roche | July 14, 1953 |
| 2,669,330 | Banker | Feb. 16, 1954 |
| 2,689,030 | Wemp | Sept. 14, 1954 |
| 2,726,557 | Ackeman | Dec. 13, 1955 |
| 2,738,689 | Dodge | Mar. 20, 1956 |
| 2,769,350 | Lucia et al. | Nov. 6, 1956 |
| 2,770,148 | Wayman | Nov. 13, 1956 |
| 2,845,817 | Polomski | Aug. 5, 1958 |
| 2,965,202 | Christenson | Dec. 20, 1960 |
| 2,978,928 | Tuck et al. | Apr. 11, 1961 |